(12) United States Patent
Zafarullahkhan et al.

(10) Patent No.: US 11,902,107 B2
(45) Date of Patent: Feb. 13, 2024

(54) EYEWEAR EXPERIENCE HUB FOR NETWORK RESOURCE OPTIMIZATION

(71) Applicant: Snap Inc., Santa Monica, CA (US)

(72) Inventors: Mehmood Zafarullahkhan, Torrance, CA (US); Manish Bodhankar, Seattle, WA (US); Mingyang Chai, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/742,103

(22) Filed: May 11, 2022

(65) Prior Publication Data

US 2022/0376993 A1 Nov. 24, 2022

Related U.S. Application Data

(60) Provisional application No. 63/190,317, filed on May 19, 2021.

(51) Int. Cl.
  *H04L 41/50* (2022.01)
  *H04L 67/56* (2022.01)
(52) U.S. Cl.
  CPC .............. *H04L 41/50* (2013.01); *H04L 67/56* (2022.05)
(58) Field of Classification Search
  CPC ......... H04L 41/50; H04L 67/56; H04L 67/60; H04L 67/2895
  See application file for complete search history.

(56) References Cited

U.S. PATENT DOCUMENTS 11,397,629 B1* 7/2022 Koneru ............... G06F 11/0709
2011/0314121 A1* 12/2011 Navda ..................... H04W 4/18
 709/217

(Continued)

FOREIGN PATENT DOCUMENTS

WO  2013055413 A1  4/2013

OTHER PUBLICATIONS

International Search Report and Written Opinion for International Application No. PCT/US2022/028810, dated Jul. 28, 2022 (Jul. 28, 2022)—14 pages.

*Primary Examiner* — Michael A Keller
*Assistant Examiner* — Thao D Duong
(74) *Attorney, Agent, or Firm* — Culhane Meadows PLLC; Stephen J. Weed

(57) ABSTRACT

An electronic eyewear device communicates with a backend service system via a device hub that provides an edge proxy server for a service request from the electronic eyewear device to the backend service system. The device hub provides a standardized request/response optimized schema for providing a standardized communication between the electronic eyewear device and the backend service system in response to the service request in a standardized format adapted to minimize network requests. A standardized communication is provided to at least one backend service of the backend service system, and a standardized response to the standardized service request is received from the backend service(s) and provided to the electronic eyewear device. In one configuration, the device hub may issue asynchronous requests to backend services in response to a service request from the electronic eyewear device and merge responses into a standardized response for the electronic eyewear device.

17 Claims, 14 Drawing Sheets

(56) References Cited

U.S. PATENT DOCUMENTS

| | | | |
|---|---|---|---|
| 2018/0033211 A1* | 2/2018 | Berman | G06F 3/04886 |
| 2018/0069760 A1* | 3/2018 | Zhang | H04L 41/0896 |
| 2018/0350056 A1* | 12/2018 | Cardenas Bernal | G01N 21/954 |
| 2018/0357670 A1* | 12/2018 | DeLuca | G06Q 30/0255 |
| 2020/0159857 A1* | 5/2020 | Ash | G06F 16/3337 |
| 2021/0117680 A1* | 4/2021 | Chaudhri | G06F 3/04847 |
| 2021/0216773 A1* | 7/2021 | Bohannon | G06V 20/20 |
| 2021/0385886 A1* | 12/2021 | Lo | H04W 76/10 |
| 2022/0292222 A1* | 9/2022 | Tikhomirov | G06F 21/6263 |
| 2023/0148973 A1* | 5/2023 | Martin | A61B 5/0205 600/301 |

\* cited by examiner

Fork/Join Model

Passthrough Model

Proxy and Logic Handler

EYEWEAR EXPERIENCE HUB FOR NETWORK RESOURCE OPTIMIZATION

CROSS-REFERENCE TO RELATED APPLICATIONS

This application claims priority to U.S. Provisional Application Ser. No. 63/190,317 filed on May 19, 2021, the contents of which are incorporated fully herein by reference.

TECHNICAL FIELD

Examples set forth in the present disclosure relate to server architecture for portable electronic devices, including wearable electronic devices such as smart glasses. More particularly, but not by way of limitation, the present disclosure describes a streamlined solution to client-server integration that optimizes request/response schema suitable for limited resource electronic devices such as smart glasses.

BACKGROUND

Wearable electronic devices such as electronic eyewear devices may communicate with application programs running on mobile devices such as a user's smartphone and, in some cases, may communicate directly with a server. In either case, the electronic eyewear device may support direct device integration with communication application backend services as well as third-party application programming interfaces (APIs) such as text-to-speech, the SHAZAM PLAYER® app, and the like.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
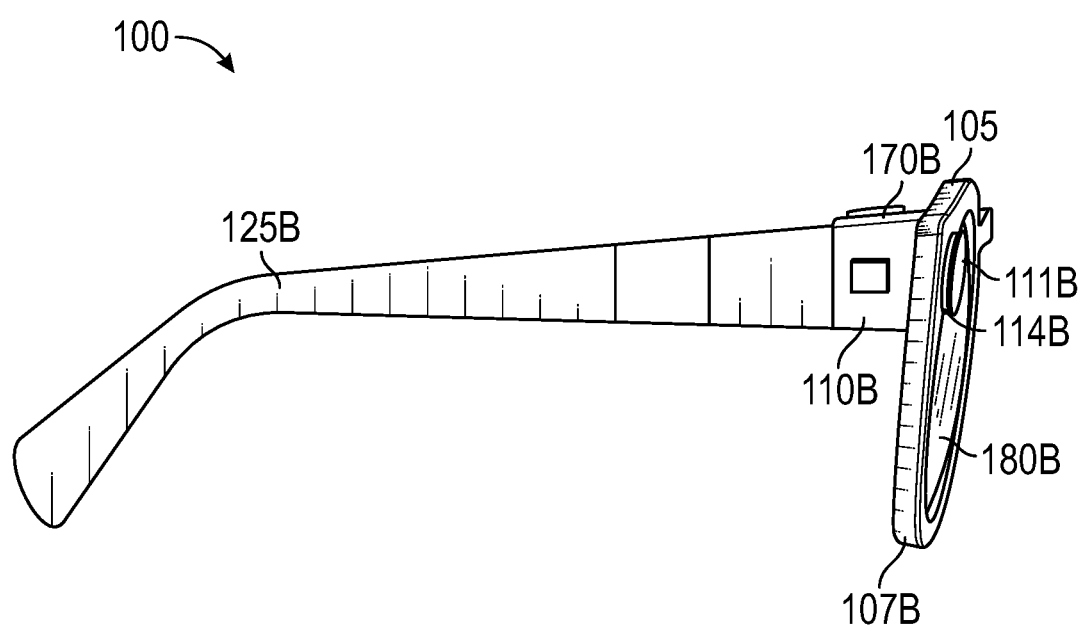
FIG. 1A illustrates a side view of an example hardware configuration of an electronic eyewear device showing a right optical assembly with an image display.

Wearable portable electronic devices such as an electronic eyewear device typically have limited processing and memory resources compared to the backend servers that support the applications associated with the electronic eyewear device. As a result, the electronic eyewear device routinely requests information and processing from the backend server during operation of the applications associated with the electronic eyewear device. A request/response model used by the electronic eyewear device for communication with the backend server may be specifically designed for a mobile application service and may not be optimized for use with the electronic eyewear device. This disparity may lead to difficulties in implementing proper security procedures and in maintaining compatibility in future iterations of at least one of the electronic eyewear device or the backend services. It is desired to minimize this disparity and to provide a request/response schema that provides visibility into operational issues and provides availability guarantees for current and future iterations of the electronic eyewear device and the associated backend services.

By enabling the electronic eyewear device to communicate directly with backend services, the electronic eyewear device may become a standalone device alternative to a mobile phone application experience with the backend services. The device hub described herein provides a streamlined solution to client-server integration that optimizes request/response schema suitable for limited resource electronic devices such as electronic eyewear devices. In sample configurations, the device hub described herein provides device integration with backend services as well as third-party application programming interfaces (APIs) such as text-to-speech, the SHAZAM PLAYER® app, and the like.

The resulting schema enables service availability guarantees and frees software developers from having to integrate different backend configurations and error handling schemes, while further providing standardized security procedures, compatibility, and operations.

In addressing these issues, this disclosure is directed to a system including an electronic eyewear device, a backend service system, and a device hub that provides an edge proxy server for a service request from the electronic eyewear device to the backend service system. The device hub further provides a standardized request/response optimized schema for providing a communication between the electronic eyewear device and the backend service system in response to the service request in a standardized format adapted to minimize network requests. The standardized communication is provided to at least one backend service of the backend service system, and a standardized response to the standardized service request is received from the at least one backend service of the backend service system and provided to the electronic eyewear device. In one configuration, the device hub may issue asynchronous requests to backend services in response to a service request from the electronic eyewear device and merge responses into a standardized response for the electronic eyewear device.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. Sample electronic eyewear devices that may communicate with the device hub will be described with respect to FIGS. 1-5, while the device hub and the remainder of the system will be described with respect to FIGS. 6-11.

Figure 2A:
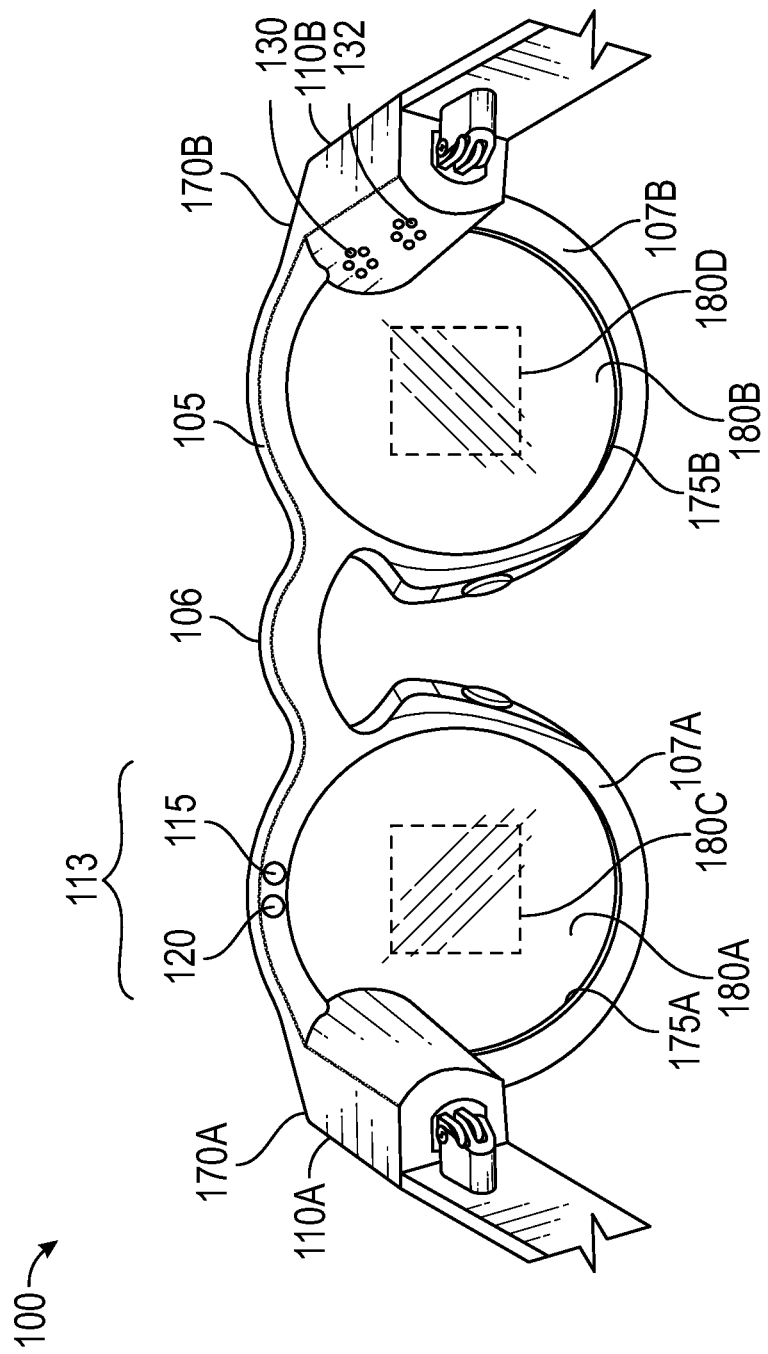
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 5) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 612 of FIG. 6) for digital processing along with a timestamp in which the image of the scene is captured. Image processor 612 may include circuitry to receive signals from the visible light camera 114A-B and to process those signals from the visible light cameras 114A-B into a format suitable for storage in the memory (element 634 of FIG. 6). The timestamp may be added by the image processor 612 or other processor that controls operation of the visible light cameras 114A-B. Visible light cameras 114A-B allow the stereo camera to simulate human binocular vision. Stereo cameras also provide the ability to reproduce three-dimensional images (image 515 of FIG. 5) based on two captured images (elements 558A-B of FIG. 5) from the visible light cameras 114A-B, respectively, having the same timestamp. Such three-dimensional images 515 allow for an immersive lifelike experience, e.g., for virtual reality or video gaming. For stereoscopic vision, the pair of images 558A-B may be generated at a given moment in time—one image for each of the left and right visible light cameras 114A-B. When the pair of generated images 558A-B from the frontward facing field of view (FOV) 111A-B of the left and right visible light cameras 114A-B are stitched together (e.g., by the image processor 612), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 632 (FIG. 6) is coupled to the electronic eyewear device 100 and connected to the visible light cameras 114A-B and memory 634 (FIG. 6) accessible to the processor 632, and programming in the memory 634 may be provided in the electronic eyewear device 100 itself.

Figure 1B:
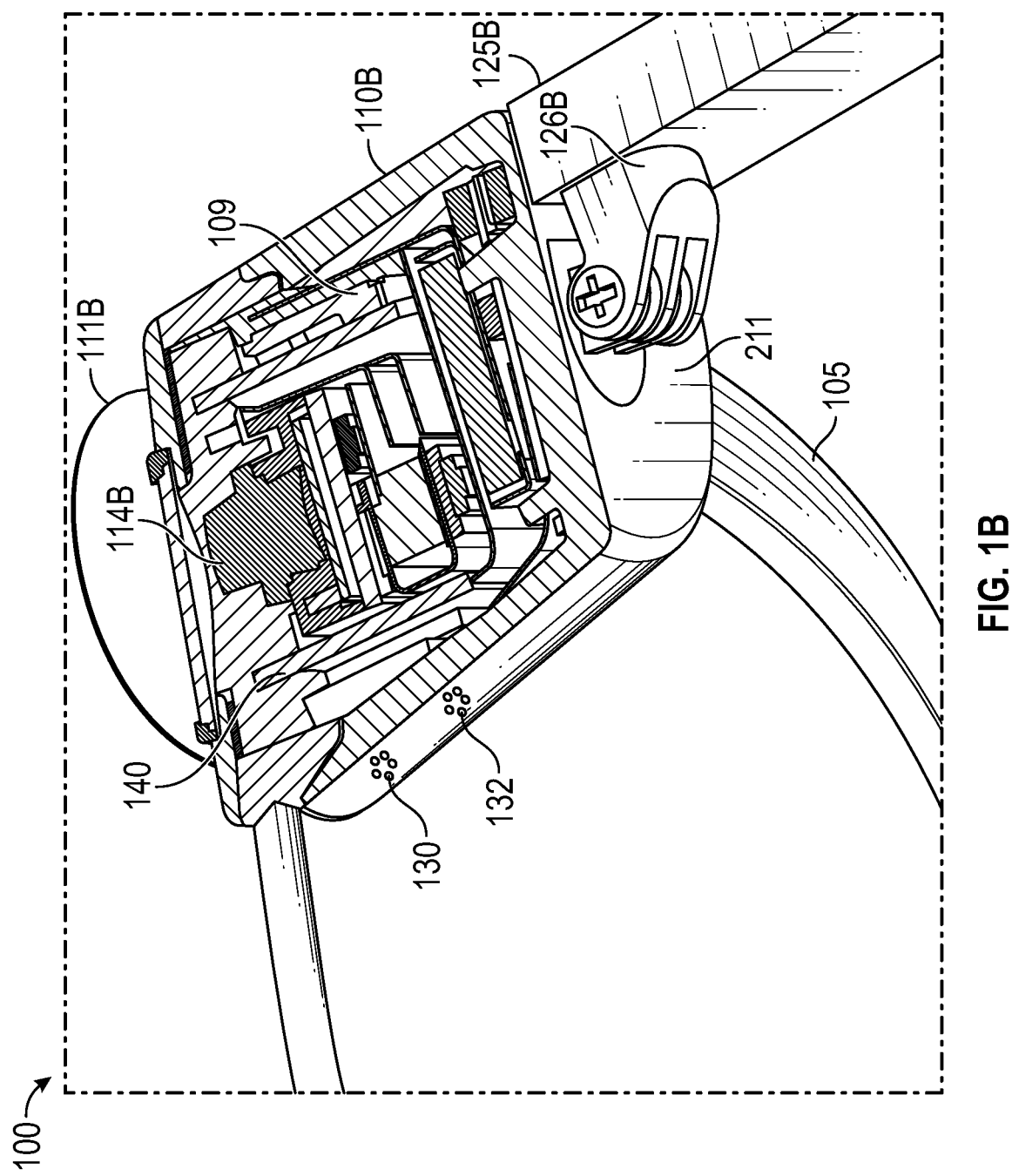
FIG. 1B illustrates a top cross-sectional view of a temple of the electronic eyewear device of FIG. 1A.
Figure 2B:
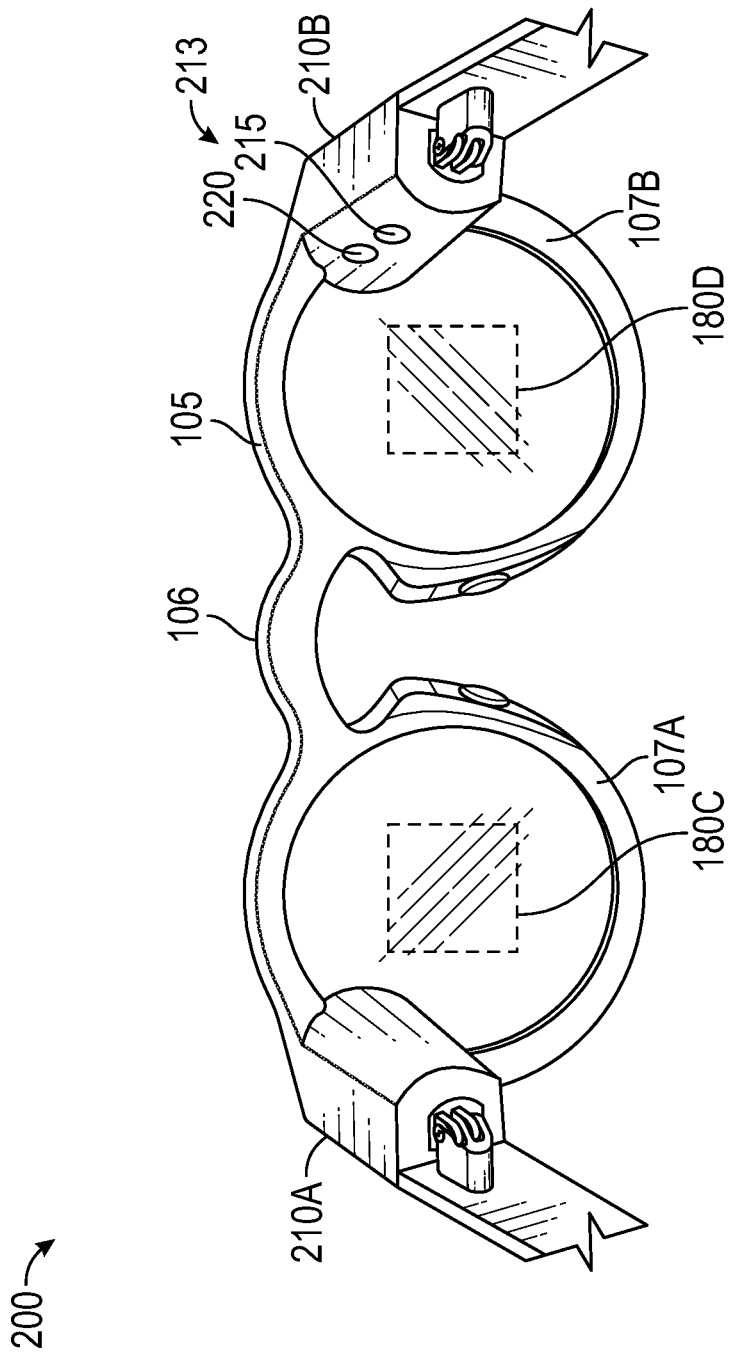
FIG. 2B illustrates a rear view of an example hardware configuration of another electronic eyewear device in an example hardware configuration.
Figure 2C:
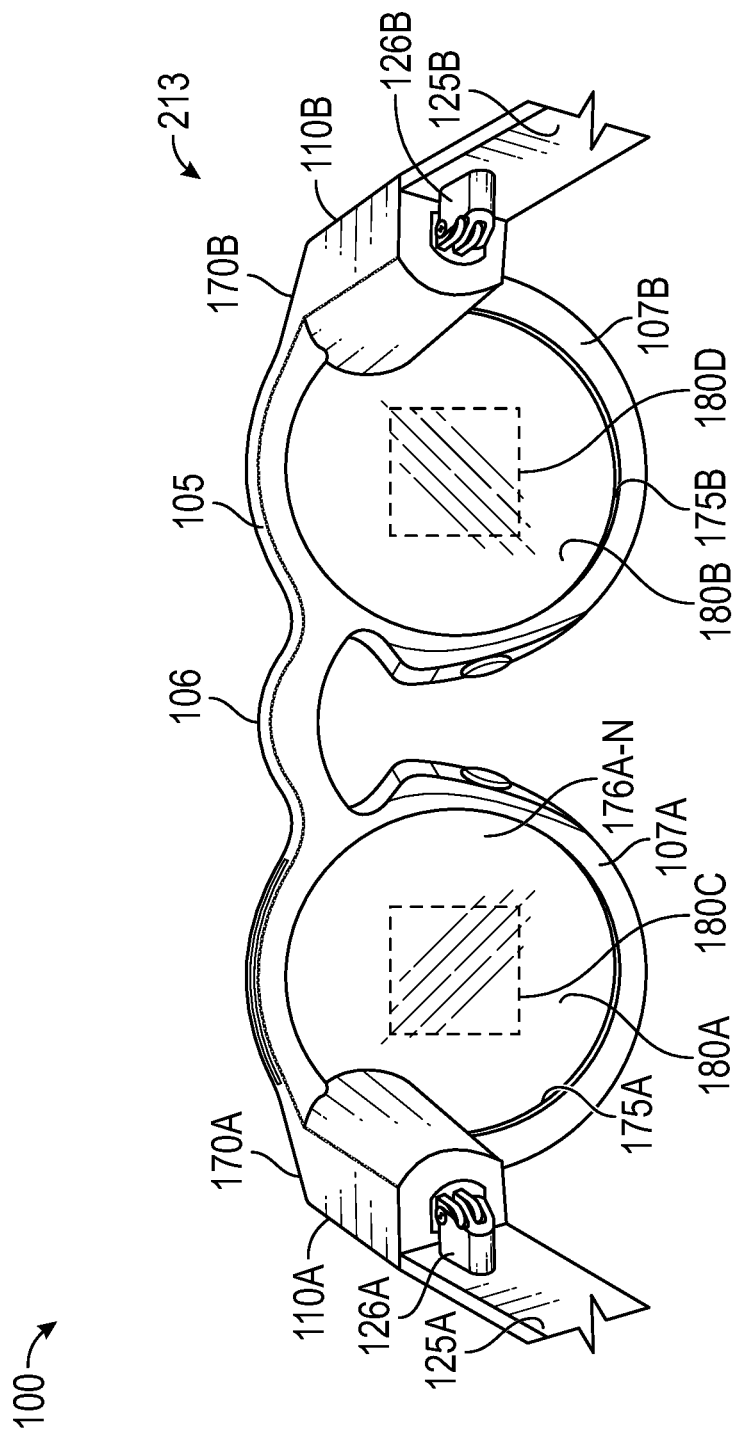
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 642 of FIG. 6) coupled to the see-through image displays 180C-D of optical assembly 180A-B to control the image displays 180C-D of optical assembly 180A-B to present the sequence of displayed images 515, which are described in further detail below. Electronic eyewear device 100 may further include the memory 634 and the processor 632 having access to the image display driver 642 and the memory 634, as well as programming in the memory 634. Execution of the programming by the processor 632 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction 230.

Execution of the programming by the processor 632 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 632 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 632 may further configure the electronic eyewear device 100 to generate a successive displayed image of the sequence of displayed images based on the field of view adjustment. Execution of the programming by the processor 632 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B.

It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
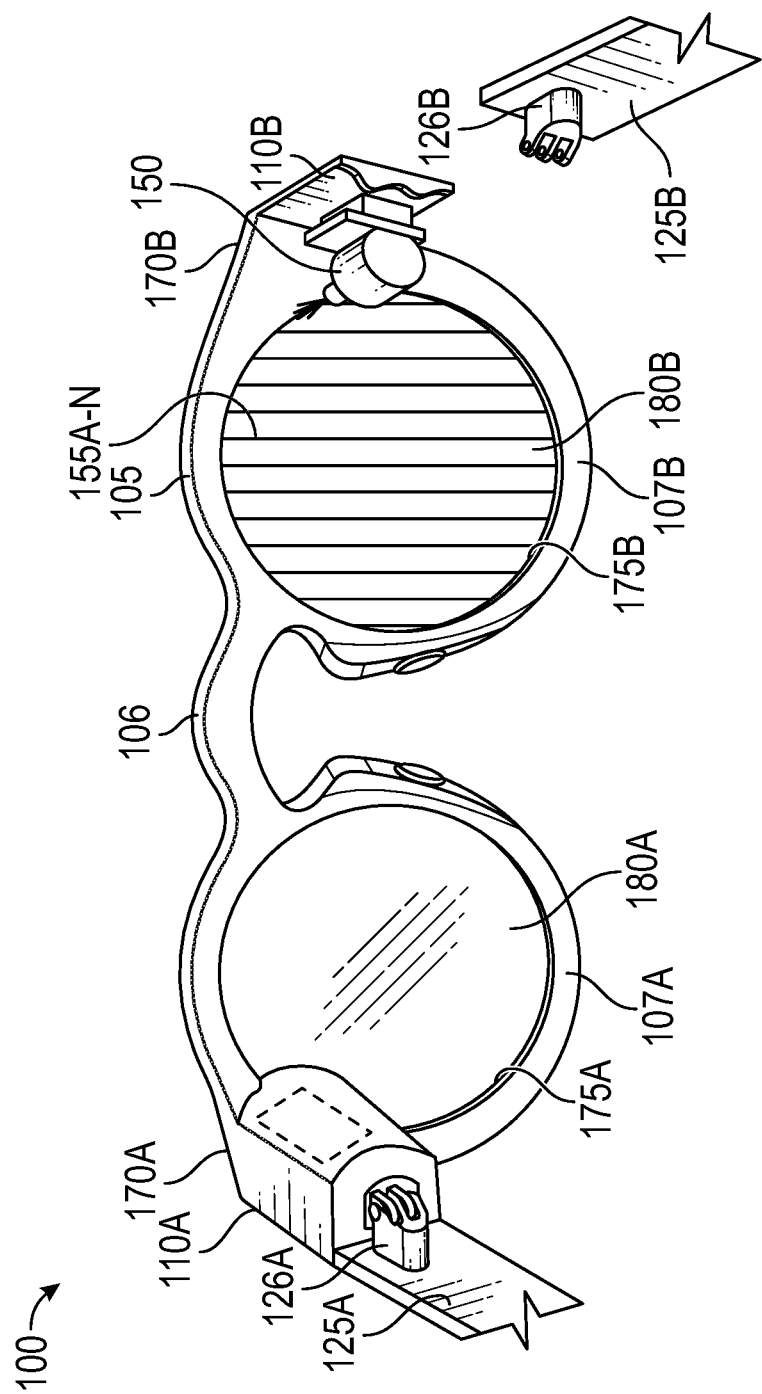

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips and a projector (not shown) in left temple 110A). The second optical assembly 180B may include the second see-through image display 180D (e.g., a display matrix of FIG. 2C or optical strips and a projector 150 in right temple 110B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
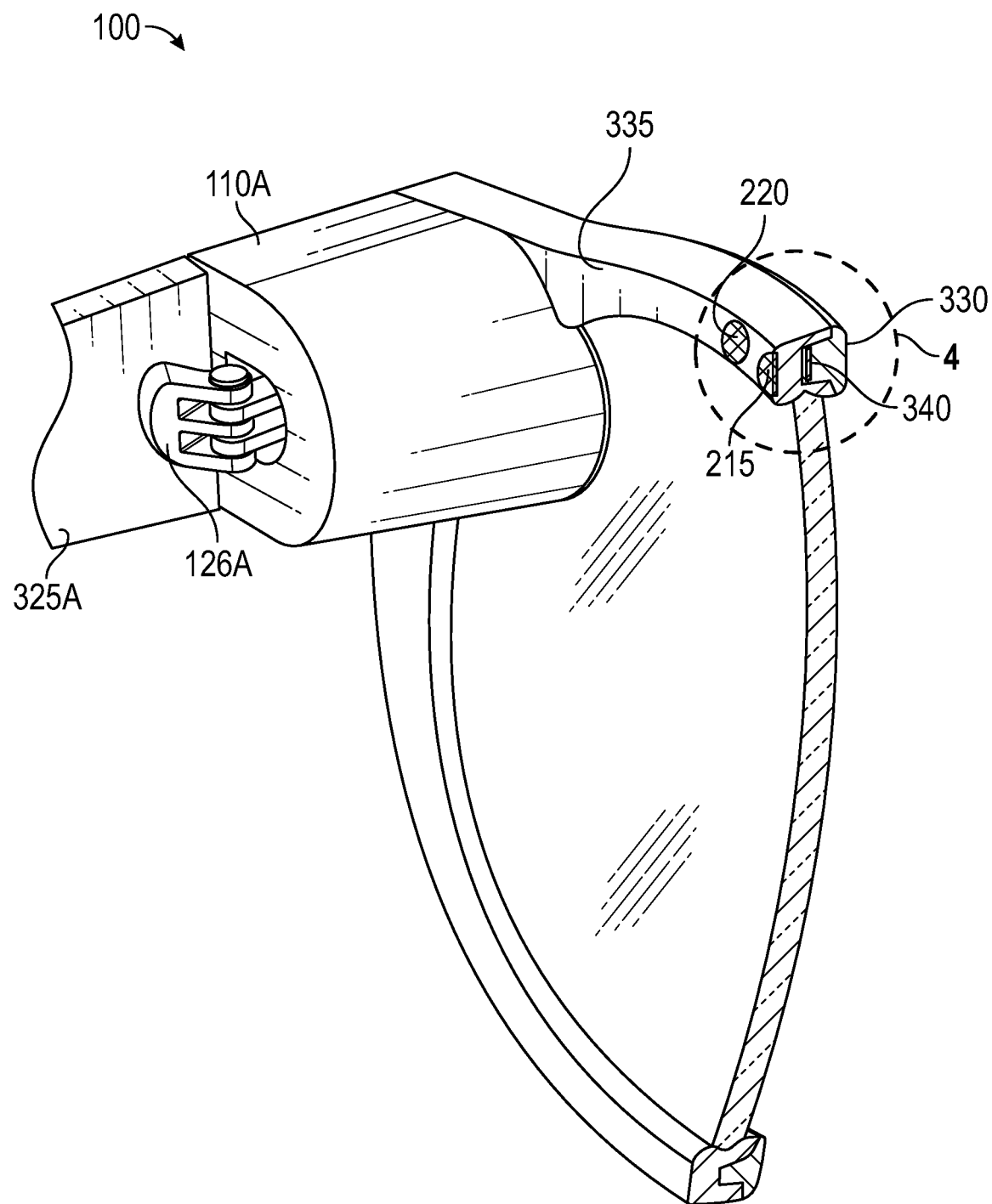
FIG. 3 illustrates a rear perspective view of the electronic eyewear device of FIG. 2A depicting an infrared emitter, an infrared camera, a frame front, a frame back, and a circuit board.

FIG. 3 illustrates a rear perspective view of the electronic eyewear device 100 of FIG. 2A. The electronic eyewear device 100 includes an infrared emitter 215, infrared camera 220, a frame front 330, a frame back 335, and a circuit board 340. It can be seen in FIG. 3 that the upper portion of the left rim of the frame of the electronic eyewear device 100 may include the frame front 330 and the frame back 335. An opening for the infrared emitter 215 is formed on the frame back 335.

As shown in the encircled cross-section 4 in the upper middle portion of the left rim of the frame, a circuit board, which may be a flexible PCB 340, is sandwiched between the frame front 330 and the frame back 335. Also shown in further detail is the attachment of the left temple 110A to the left hinged arm 325A via the left hinge 126A. In some examples, components of the eye movement tracker 213, including the infrared emitter 215, the flexible PCB 340, or other electrical connectors or contacts may be located on the left hinged arm 325A or the left hinge 126A.

Figure 4:
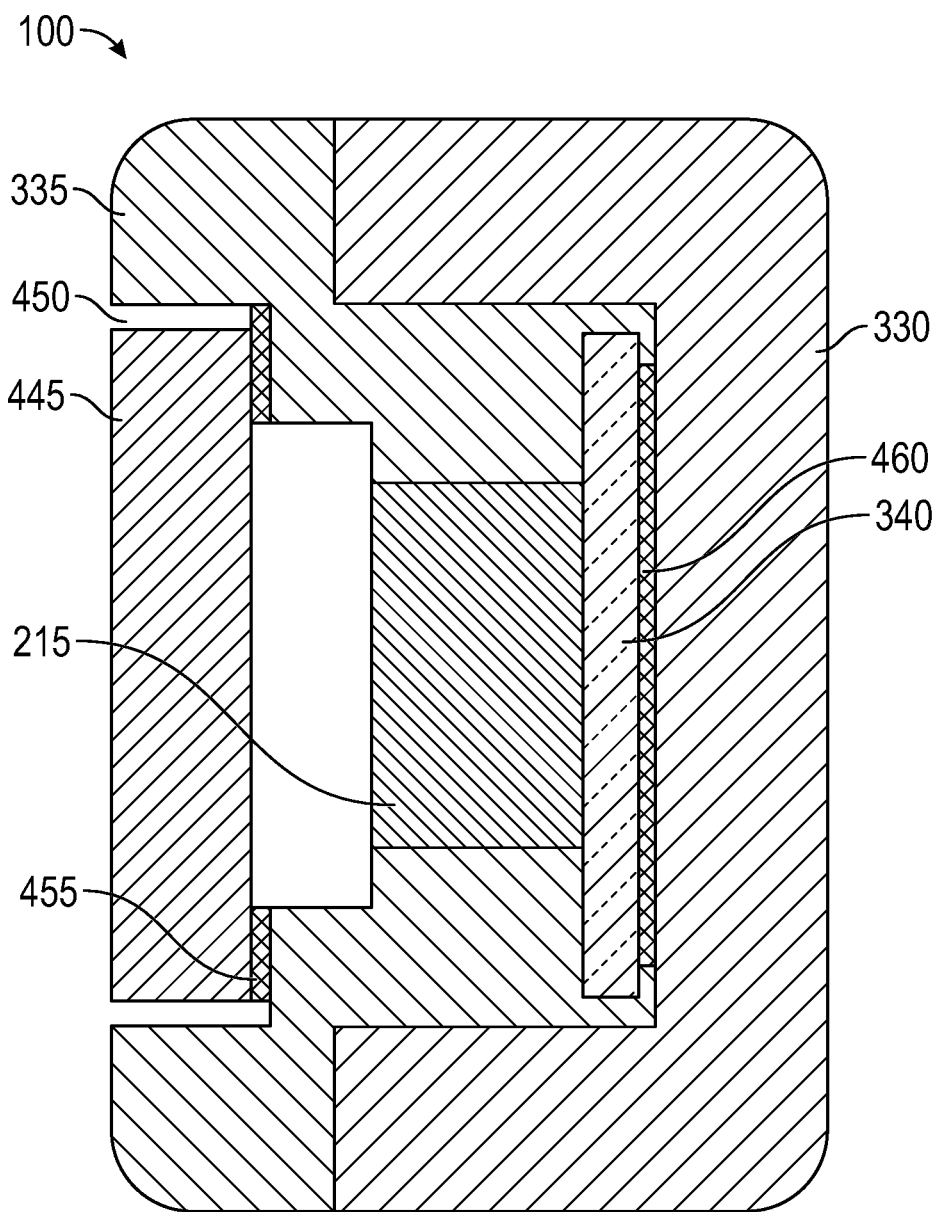
FIG. 4 illustrates a cross-sectional view taken through the infrared emitter and the frame of the electronic eyewear device of FIG. 3.

FIG. 4 is a cross-sectional view through the infrared emitter 215 and the frame corresponding to the encircled cross-section 4 of the electronic eyewear device 100 of FIG. 3. Multiple layers of the electronic eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 may be reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 may include an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling also can be indirect via intervening components.

Figure 5:
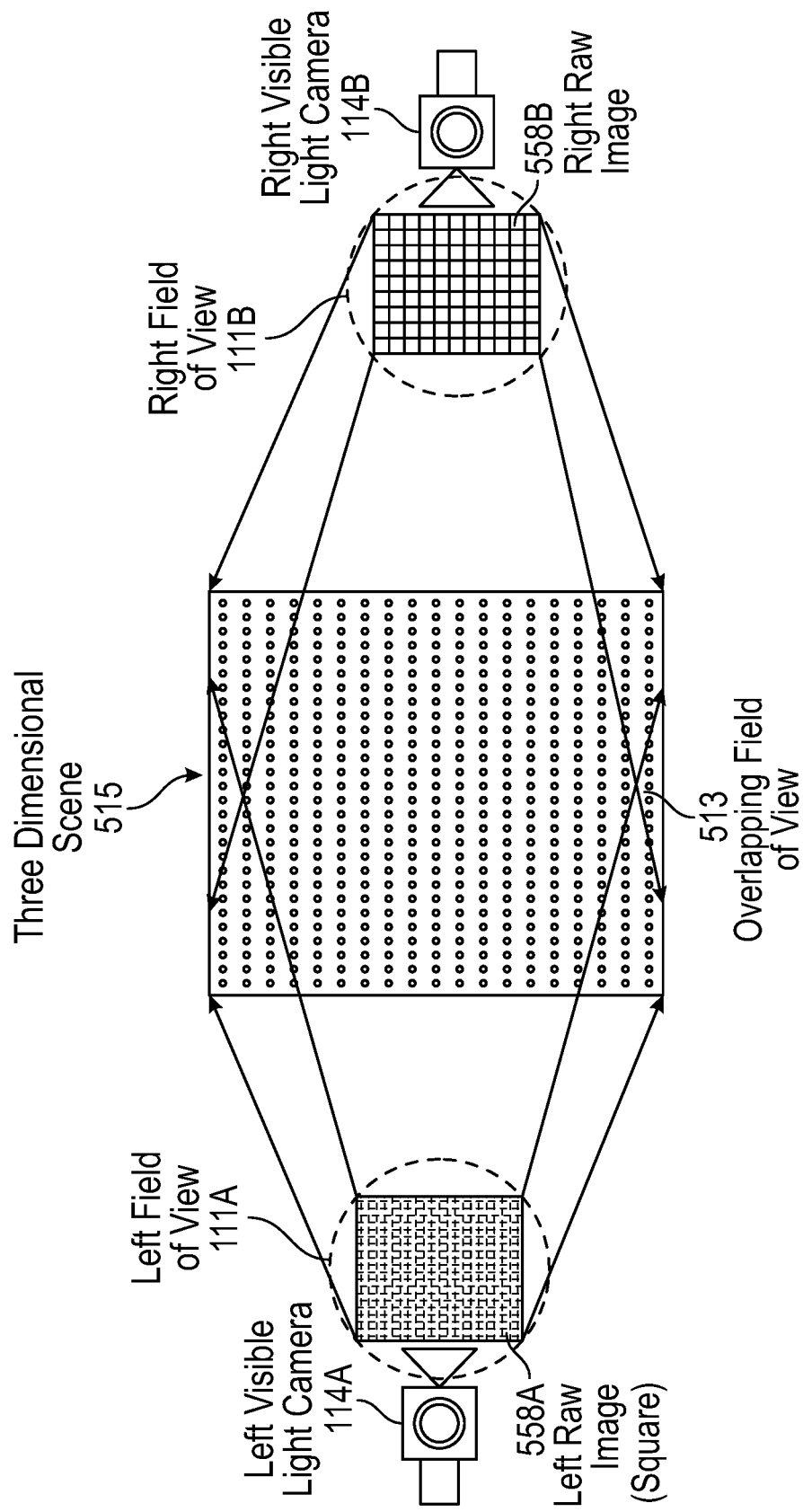
FIG. 5 illustrates an example of visible light captured by the left visible light camera as a left raw image and visible light captured by the right visible light camera as a right raw image.
Figure 6:
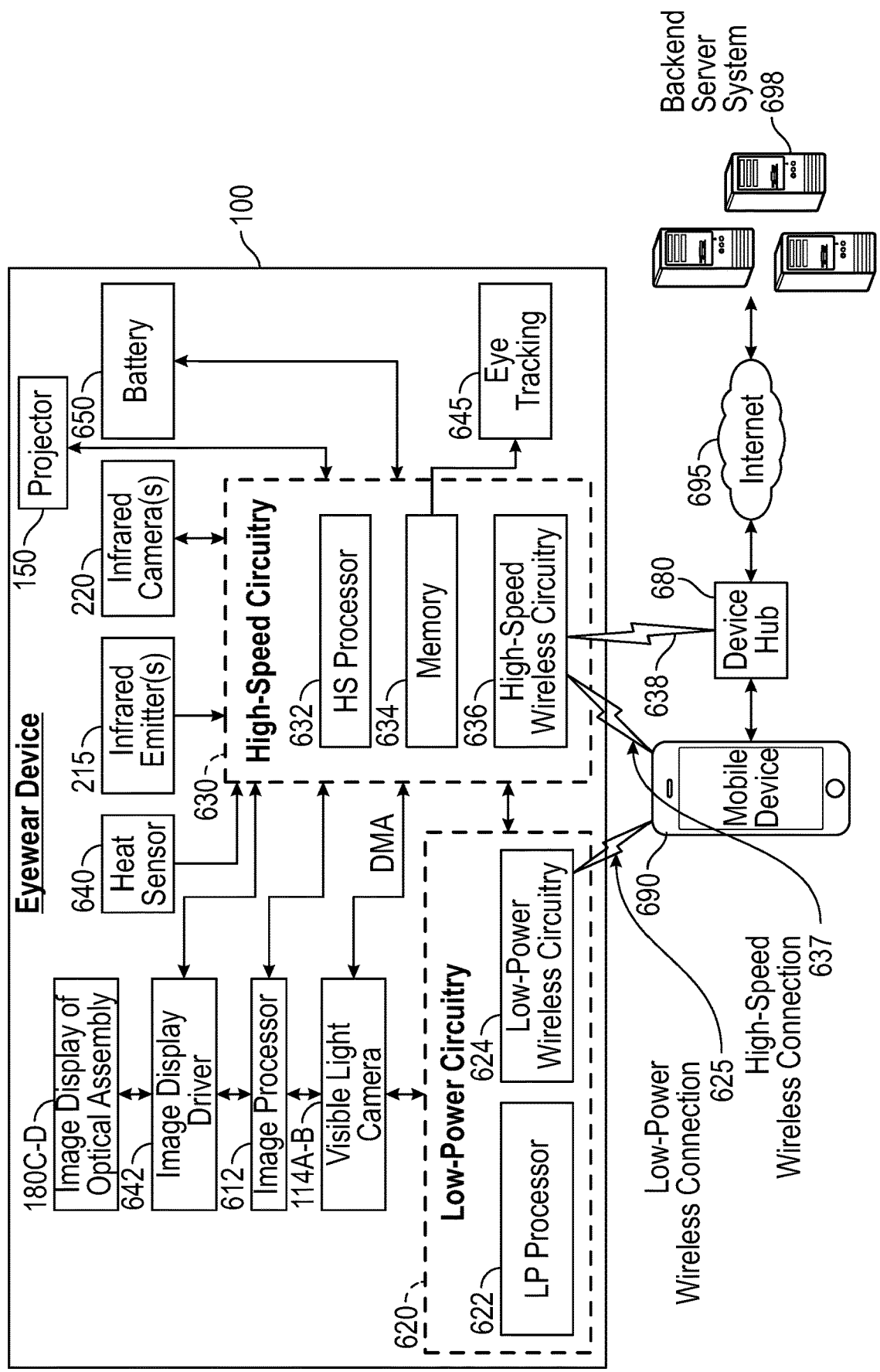
FIG. 6 illustrates a block diagram of electronic components of the electronic eyewear device.

FIG. 5 illustrates an example of capturing visible light with cameras 114A-B. Visible light is captured by the left visible light camera 114A with a round field of view (FOV). 111A. A chosen rectangular left raw image 558A is used for image processing by image processor 612 (FIG. 6). Visible light is also captured by the right visible light camera 114B with a round FOV 111B. A rectangular right raw image 558B chosen by the image processor 612 is used for image processing by processor 612. Based on processing of the left raw image 558A and the right raw image 558B having an overlapping field of view 513, a three-dimensional image 515 of a three-dimensional scene, referred to hereafter as an immersive image, is generated by processor 612 and displayed by displays 180C and 180D and which is viewable by the user.

FIG. 6 illustrates a high-level functional block diagram including example electronic components disposed in electronic eyewear device 100 or 200. The illustrated electronic components include the processor 632, the memory 634, and the see-through image display 180C and 180D.

Memory 634 includes instructions for execution by processor 632 to implement the functionality of electronic eyewear devices 100 and 200, including instructions for processor 632 to control in the image 515. Processor 632 receives power from battery 650 and executes the instructions stored in memory 634, or integrated with the processor 632 on-chip, to perform the functionality of electronic eyewear devices 100 and 200 and to communicate with external devices via wireless connections.

The electronic eyewear devices 100 and 200 may incorporate an eye movement tracker 645 (e.g., shown as infrared emitter 215 and infrared camera 220 in FIG. 2B) and may provide user interface adjustments via a mobile device 690 and a server system 698 connected via various networks. Mobile device 690 may be a smartphone, tablet, laptop computer, access point, or any other such device capable of connecting with the electronic eyewear devices 100 or 200 using both a low-power wireless connection 625 and a high-speed wireless connection 637. Mobile device 690 is further connected to server system 698 via a network 695. The network 695 may include any combination of wired and wireless connections. Also, as will be described in more detail below with respect to FIGS. 8-10, a device hub 680 for the electronic eyewear devices 100 and 200 may be provided between the mobile device 690 and the server system 698, or the device hub 680 may be incorporated into the mobile device 690.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 642, image processor 612, low-power circuitry 620, and high-speed circuitry 630. The components shown in FIG. 6 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 645 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 642 to present the sequence of displayed images, including the initial displayed image with the initial field of view and the successive displayed image with the successive field of view.

As shown in FIG. 6, high-speed circuitry 630 includes high-speed processor 632, memory 634, and high-speed wireless circuitry 636. In the example, the image display driver 642 is coupled to the high-speed circuitry 630 and operated by the high-speed processor 632 in order to drive the left and right image displays 180C-D of the optical assembly 180A-B. High-speed processor 632 may be any processor capable of managing high-speed communications and operation of any general computing system needed for electronic eyewear device 100 or 200. High-speed processor 632 includes processing resources needed for managing high-speed data transfers on high-speed wireless connection 637 to a wireless local area network (WLAN) using high-speed wireless circuitry 636. In certain examples, the high-speed processor 632 executes an operating system such as a LINUX operating system or other such operating system of the electronic eyewear device 100 or 200 and the operating system is stored in memory 634 for execution. In addition to any other responsibilities, the high-speed processor 632 executing a software architecture for the electronic eyewear device 100 or 200 is used to manage data transfers with high-speed wireless circuitry 636. In certain examples, high-speed wireless circuitry 636 is configured to implement Institute of Electrical and Electronic Engineers (IEEE) 802.11 communication standards, also referred to herein as WI-FI®. In other examples, other high-speed communications standards may be implemented by high-speed wireless circuitry 636.

Low-power wireless circuitry 624 and the high-speed wireless circuitry 636 of the electronic eyewear devices 100 and 200 can include short range transceivers (BLUETOOTH®) and wireless wide, local, or wide area network transceivers (e.g., cellular or WI-FI®). Mobile device 690, including the transceivers communicating via the low-power wireless connection 625 and high-speed wireless connection 637, may be implemented using details of the architecture of the electronic eyewear device 100 and 200, as can other elements of network 695 or the device hub 680.

Memory 634 includes any storage device capable of storing various data and applications, including, among other things, color maps, camera data generated by the left and right visible light cameras 114A-B and the image processor 612, as well as images generated for display by the image display driver 642 on the see-through image displays 180C-D of the optical assembly 180A-B. While memory 634 is shown as integrated with high-speed circuitry 630, in other examples, memory 634 may be an independent stand-alone element of the electronic eyewear device 100 or 200. In certain such examples, electrical routing lines may provide a connection through a system on chip that includes the high-speed processor 632 from the image processor 612 or low-power processor 622 to the memory 634. In other examples, the high-speed processor 632 may manage addressing of memory 634 such that the low-power processor 622 will boot the high-speed processor 632 any time that a read or write operation involving memory 634 is needed.

Server system 698 may be one or more computing devices as part of a service or network computing system, for example, that includes a processor, a memory, and network communication interface to communicate over the network 695 with the mobile device 690 and electronic eyewear devices 100 and 200. Electronic eyewear devices 100 and 200 may be connected with a host computer via the device hub 680 as described below. For example, the electronic eyewear devices 100 or 200 may be paired with the mobile device 690 via the high-speed wireless connection 637 or directly connected to the device hub 680 via high-speed wireless connection 638 or to the server system 698 via the network 695.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 642. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 690, the device hub 680, and server system 698, may include alpha-numeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 640, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 625 and 637 from the mobile device 690 via the low-power wireless circuitry 624 or high-speed wireless circuitry 636.

Device Hub

When developing electronic eyewear device features for electronic eyewear devices 100 and 200 of the type described above for use with communication applications that communicate with backend services, it is generally desirable to re-use the existing client code bases to the extent possible to develop and deliver features faster with less resources. Client modules for electronic eyewear devices 100 and 200 may leverage most of the libraries that are already part of different communication application backend features where the client components take care of interaction with their respective backends on associated servers. There also may be some custom endpoints and services that are managed like depth services, and release notes may be maintained by the backend development team for the electronic eyewear devices 100 and 200.

This approach works well when there is only one or a few main use cases such as synchronizing the electronic eyewear device 100 or 200 to backend server memories through a smartphone operating as a proxy. However, recent iterations of electronic eyewear devices 100 and 200 may directly synchronize with memories of the backend server through a Full Service Network (FSN) hosted solution. In such cases, it is further desirable to have direct electronic eyewear device integrations with backend services as well as third-party APIs such as text-to-speech, the SHAZAM PLAYER® app, and the like.

Figure 7:
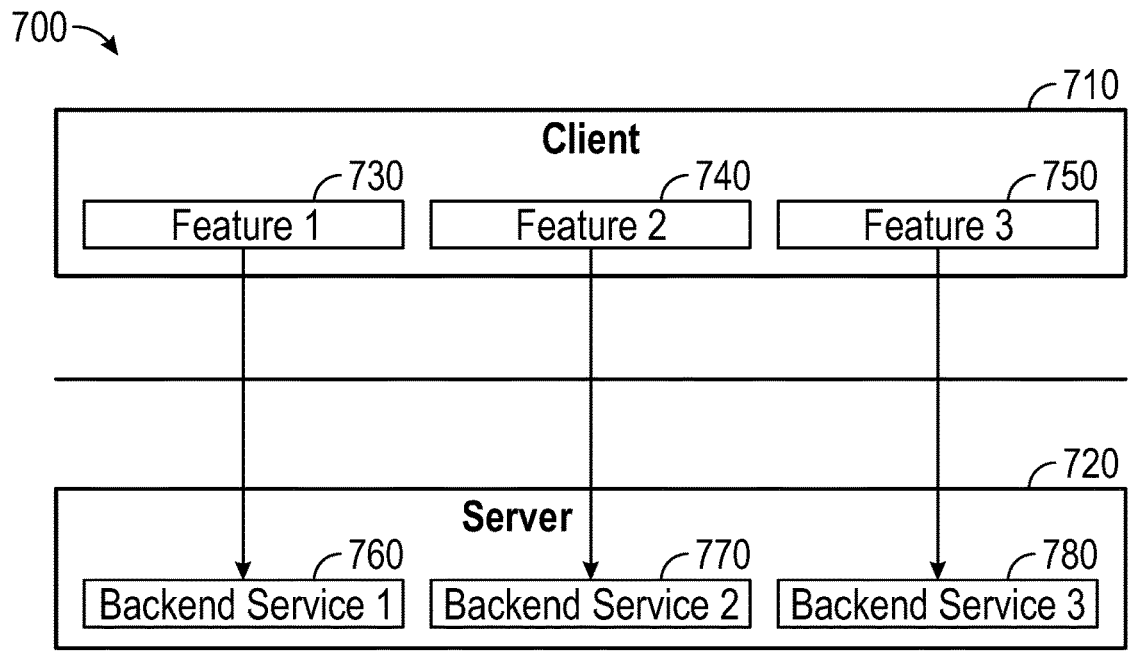
FIG. 7 illustrates a system providing communications between feature modules of a communication application running on a client and sample corresponding backend services running on a server.

FIG. 7 illustrates a system 700 providing communications between feature modules of a communication application such as SNAPCHAT® available from Snap, Inc. running on a client 710 and sample corresponding backend services running on a server 720. As illustrated, application services including client feature 1 730, client feature 2 740, and client feature 3 750 may communicate directly with backend service 1 760, backend service 2 770, and backend service 3 780, respectively. As just noted, the approach illustrated in FIG. 7 works well when there are few use cases. However, feature rich electronic eyewear devices require more and more service integrations to happen directly over WI-FI® to respective backends. Every service integration requires coordination effort from the electronic eyewear device development team and the respective backend services team which sometimes can use an existing client; however, some use cases may require customizations to be supported by the backend services that require overhead of maintaining the mobile compatibility along with corresponding electronic eyewear device based features.

APIs currently supported for use with communication applications may be richer and use fields that might not be required for the electronic eyewear device 100 or 200 and can result in heavy resource usage. This currently adds a lot of dependency on other development teams such as backend services development teams who are not familiar with the requirements for the electronic eyewear device 100 or 200 that may be different from the requirements of a smartphone or other electronic communication device. As a result, the developers may end up designing and re-designing data models on the electronic eyewear device layer, For example, a feature of the communications application may expect an MP4 media format, while the electronic eyewear devices 100 or 200 may only support a hi-resolution MPEG format that would have to be transcoded into MP4. As a result, to add this feature, the communication application may need to be modified to include a custom transcoding solution and to support the backend ability to transport raw media to the cloud in order to perform the transcoding on the backend. This transcoding would also apply for any lens applied on the video and will require heavy coordination with other feature teams to enable and maintain the compatibility with the electronic eyewear device customizations.

Also, the client-server request and response models may be specifically designed for a mobile communication application and may not be optimized for electronic eyewear device capabilities, which would require custom solutions to be written on the client side. For example, the communication application may operate on service-oriented architecture (SOA) models that may not support sending certain events through inter-process communication (IPC) calls. Also, some application features may have extra fields that become very heavy while serializing and deserializing across the service boundaries. As a result, it may become necessary to customize the data model of the application feature on the client to a data model that is feasible for the electronic eyewear devices 100 or 200 and to convert that data model while sending messages to the backend or to implement a proxy server that will convert the electronic eyewear event request into an event that would be understood by the application feature. This again adds overhead of providing custom solutions different from standard application solutions.

In addition, third-party API integrations or external APIs may require the communication application developers to handle custom authorization solutions that would be independent from the authorization solution used by the communication application. For example, if the communication application integrates a third-party text-to-speech service and the third-party text-to-speech service is to be replaced by another third-party provider, a separate authorization implementation other than the one provided to the user for accessing the communication application may become necessary. The system would end up having a speech history which may also need to be directly integrated with the APIs. This adds significant overhead on the client both in terms of implementing proper security procedures, maintaining any compatibility issues in the future, and providing the visibility into operational issues.

The electronic eyewear devices also may be dependent on other backend services availability guarantees and susceptible to failure since client code may not be fully owned by the electronic eyewear device's backend services. Business logic may be pushed on the client side for certain features since the other backend service might not support the business logic. As a result, most coordination may be pushed to the client (for example, low depth indicator), which is undesirable due to the limited resources on the client side.

The client-side development teams also have a dependency on the backend service team's schedule for breaking the API (non-backwards compatible) changes and may have to come up with strategies to deal with API versioning. The backend services team may integrate a one-off endpoint in other backends or may need to engage other development teams to provide custom solutions for the electronic eyewear device 100 or 200 such as, for example, migration of certain fields that were left and broken. There also may be a synchronized call for memories to upload media files and then to perform a pub/sub call to a depth service to extract the depth maps and then use the depth service to update the features in the communication application for the depth map Uniform Resource Locator (URL). This adds a lot of failure modes making it difficult to identify issues between the backend service, the pub/sub queue, depth services, and the like. Also, no single view is available about any issue that occurs across different services which may require more time for finding issues and triaging and fixing such issues.

Also, wearable electronic devices such as electronic eyewear devices 100 and 200 are temperature and battery constrained, so to enhance performance several of the processing intensive functions may be offloaded to a remote processing device. However, such offloading is only viable where the communication latencies are relatively minor.

Further, the services provided to wearable electronic devices such as electronic eyewear devices 100 and 200 may service electronic eyewear devices from multiple companies with different protocols, which may require conversion. The device hub 680 described herein may permit one protocol for each response as the request/response schema of the device hub 680 is configured to minimize protocol conversions and standardize network interactions by providing a normalized view of data from all available services while providing minimal logic on the electronic eyewear device.

The device hub 680 described herein addresses the above-mentioned issues by providing an edge proxy server for all requests by the electronic eyewear devices 100 or 200. In its simplest form, the device hub 680 functions as a router that accepts requests from the electronic eyewear devices 100 and 200 and forwards the request to the respective backend services making it more of a centralized way to control the interactions by the electronic eyewear devices 100 and 200 with other cloud services.

Figure 8:
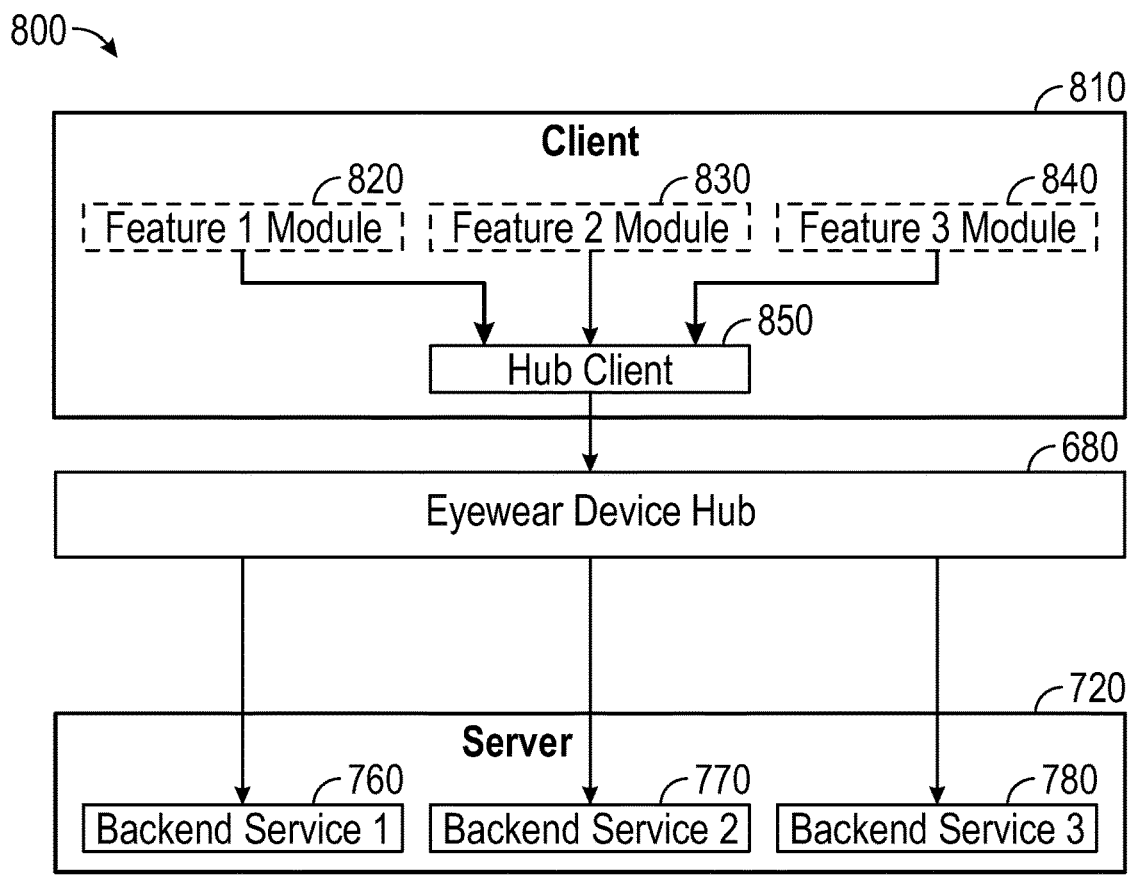
FIG. 8 illustrates a system providing communications between feature modules of a communication application running on a client and sample corresponding backend services running on a server where a device hub has been provided between the client and server in a sample configuration.

FIG. 8 illustrates a system 800 providing communications between feature modules of a communication application running on a client and sample corresponding backend services running on a server where a device hub 680 has been provided between the client 810 and server 720 in a sample configuration. As illustrated, the device hub 680 is positioned between the client 810 including features modules including, for example, Feature 1 Module 820, Feature 2 Module 830, and Feature 3 Module 840, that communicate via hub client 850 with corresponding backend services including backend service 1 760, backend service 2 770, and backend service 3 780, running on server 720. In this configuration, the client feature module 820-840 does a network request to the hub client 850, which issues a request to the eyewear device hub 680 for the desired information from the network. The eyewear device hub 680 transforms each request from the client 810 for application to a specific backend API for the requested backend service 1-3. As a result of this configuration, the development team for the electronic eyewear devices 100 and 200 will be able to build the augmented reality (AR) experience faster, with a better integration model, observability, and security. For example, only one security model would be required as the device hub 680 could make any needed conversions for use on the client side, thus enabling the security decisions to be made on the server side.

In sample configurations, the device hub 680 may act as a "Front Door" to many backend and other cloud services for the applications running on the client 810, presenting a unified interface to the electronic eyewear device clients while enabling the flexibility of implementation on the backend. Today, the clients themselves enable this by providing direct integration with other services and the coordination and changes required to support the electronic eyewear device based use cases. By moving this logic to the device hub 680, the electronic eyewear devices 100 and 200 may operate as a thin client, and the device hub 680 can take on the more complex coordination, error-handling, and security on the backend layer where it is easier to control and mitigate failures. In sample configurations, one single API gateway may be established as a centralized control, and electronic eyewear device development team may leverage the API gateway to implement the backend integration flow.

For example, certain existing backend co-ordinations like depth extraction may be moved and provided as a separate service behind the device hub 680. The device hub 680 may leverage the API gateway to provide electronic eyewear device specific authentication, authorization, rate limitation, added observability for all requests and responses, and provide a front door for other services such as text-to-speech, etc. In this fashion, the device hub 680 may provide a streamlined model of building new services for the electronic eyewear device that integrates with existing backends and third-party services.

Figure 9A:
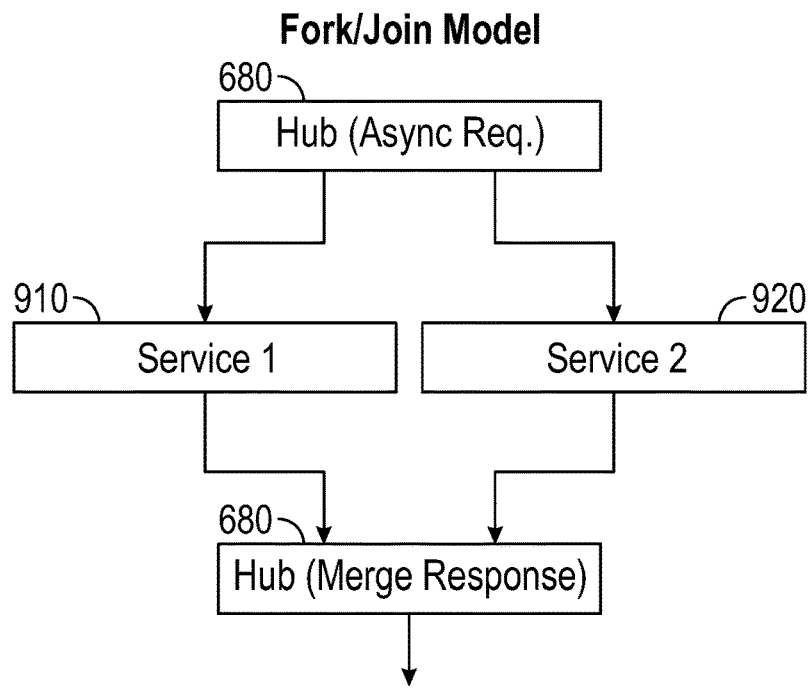
FIG. 9A illustrates a use case of the device hub in a fork/join model in a sample configuration.

The device hub 680 may support multiple use cases. For example, FIG. 9A illustrates a use case of the device hub 680 in a fork/join model. In this configuration, the client module of the electronic eyewear device client 810 may issue an asynchronous request such as a feature synchronization or a depth extraction to the device hub 680. In turn, the device hub 680 may call multiple backend services such as backend service 910 and backend service 920. The asynchronous responses from these backend services 910 and 920 may then be merged by the device hub 680 before being provided back to the electronic eyewear device client 810, thereby significantly saving processing by the electronic eyewear device client 810. As an example, the client module may use the GPS coordinates of the user (via GPS module, for example) to request location and weather data from separate services and combine the results for the location and weather into one network call. The device hub 680 thus may provide optimizations for location and caching of weather data as such accesses are not as time critical as some other augmented reality requests.

Figure 9B:
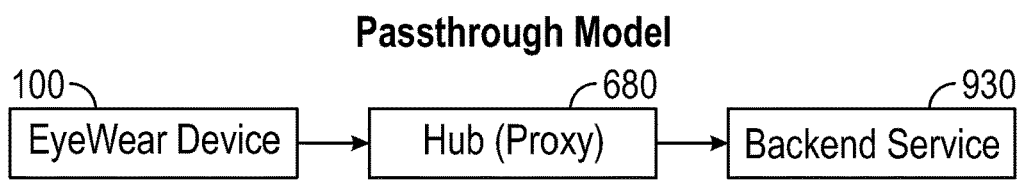
FIG. 9B illustrates a use case of the device hub in a pass-through model in a sample configuration.

FIG. 9B illustrates another use case of the device hub 680 in a pass-through model. In this configuration, the device hub 680 may function as a proxy server for backend services such as text-to-speech provided by backend service 930 to the electronic eyewear devices 100 and 200. In this configuration, the backend services may be modified or switched without changing the code on the client side.

Figure 9C:
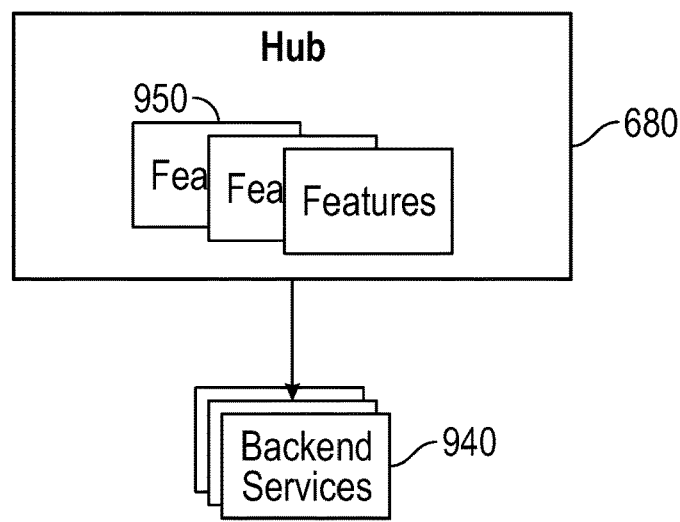
FIG. 9C illustrates a use case of the device hub as a proxy server and logic handler in a sample configuration.

In yet another use case, the device hub 680 may be used as a proxy and logic handler for backend services. As shown in FIG. 9C, the device hub 680 may implement multiple features 950 that are called by the electronic eyewear devices 100 or 200. These features 950 may, in turn, call the corresponding backend services 940, which provide the results back to the device hub 680 for communication to the electronic eyewear devices 100 and 200. Thus, in this configuration, the device hub 680 may act as a proxy server for the backend services 940 while providing the capability of implementing additional logic at the device hub 680. For example, the device hub 680 may divert network services as needed, as when the requested service is off-line.

The device hub 680 also may provide additional functionality for electronic eyewear devices 100 and 200 specifically for streamlining a request/response optimized schema that is adapted to minimize network requests. The device hub 680 may also unify all data routing through the device hub 680, provide caching and retry capabilities for different API failures, provide AB experiment integrations, request shadowing for testing new versions of services, and manage non-compatible backend changes to be compatible with the electronic eyewear devices 100 and 200 across device iterations. The device hub 680 may also provide integration with updated operating systems for the electronic eyewear devices 100 and 200 and provide support for better integration with communication services.

In addition, the API gateway may be reused to host electronic eyewear device specific integrations or a separate duplex model gateway may be implemented. The resulting gateway supports high availability guarantees and provides better error handling in the wake of any dependent service failures, taking full advantage of HTTP/2 and Quick UDP Internet Connections (QUIC) streaming protocols. The device hub 680 may provide centralized access logs, observability for every interaction the electronic eyewear devices 100 and 200 requests and may identify any issues with the backend quickly and take action. With tracing, different call spans across different service boundaries may be identified and latencies between them may be tracked.

Though the device hub 680 may depend on the respective backend services to guarantee high availability, this will be a common paradigm where it becomes possible to communicate to electronic eyewear devices 100 and 200 regarding a particular feature when the feature is not available or down and the electronic eyewear device 100 or 200 can either block certain features or notify the users accordingly. Additionally, having a cache layer on the device hub 680 that caches the results from some of these backend services may serve as a way to minimize impact from the backend service being unavailable and provide low latencies compared to what other backend services can provide. As part of the device hub 680, any dependent service failures may be handled with predefined service contracts with the client 810. For example, the client 810 can operate on fire-and-forget for media synchronization, and the server 720 can help cache the request, retry the request until it succeeds, with exponential back-off.

It will be appreciated that since the device hub 680 handles all communications for all cloud services, it becomes the backbone for enabling all the features. As a result, the device hub 680 becomes the critical tier-0 service for the electronic eyewear device 100, and all operational issues are centrally managed by the development team for the electronic eyewear devices 100 and 200. On the other hand, since the electronic eyewear device development team would be directly involved and guaranteeing service level agreements around the backend service's availability success metrics, the device hub 680 would provide greater control in failure mitigation and following up with respective service owners on the issues reducing the turnaround times.

It will be further appreciated that there is always approximately 5% additional latency for client to server communications. Once the request is inside the cloud network, the communications are relatively fast in terms of connecting to internal services. For example, text-to-speech lives in the same fiber network with 10G throughput. If the services are provisioned in the same region, then latency should not be an issue. However, this assumes that the electronic eyewear device-backend server connection is a thin, slow pipe providing low speed, low-bandwidth, and low-throughput (since it is across the firewall and backend services may or may not be regionalized). The benefit for the device hub 680 is that it reduces or replaces these low-bandwidth connections with high-bandwidth backend to backend (regionalized) connections and thereby reduces the perceived latency on the electronic eyewear devices 100 and 200. Also, in sample configurations, the network calls are minimized by the request/response schema implemented by the device hub 680 as multiple network calls adversely affect latency. The device hub 680 described herein thereby enables the electronic eyewear devices 100 and 200 to make one call to the device hub 680 which, in turn, may communicate with multiple services to reduce network calls and latency. An estimated of latencies for RTAM (real time aggregation backend) is provided in the table below (where GFE=Google Front End).

TABLE 1

RTAM (p50/p99) latencies by country (in milliseconds)

| Country | Server Latency | GFE => Server | Client => GFE | Total Latency |
|---|---|---|---|---|
| Argentina | 2/50 | 190/300 | 85/2000 | 275/2300 |
| Brazil | 2/50 | 160/270 | 80/1930 | 240/2200 |
| USA | 2/50 | 35/105 | 45/1270 | 80/1375 |
| France | 2/50 | 105/200 | 75/1240 | 180/1440 |
| Saudi Arabia | 2/50 | 125/290 | 165/2010 | 290/2300 |
| Kuwait | 2/50 | 140/295 | 150/1315 | 290/1610 |
| India | 2/50 | 265/415 | 110/1685 | 375/2100 |
| Japan | 2/50 | 135/215 | 55/985 | 190/1200 |

It will be further appreciated that the device hub 680 provides opportunities to introduce degradation modes like serving stale contents, cached contents, or pushing the retry logic to the device hub 680 rather than being handled by the client. Some classes of failures still may be handed off to clients like service not responding, etc., but this provides flexibility in how to handle failures for electronic eyewear related calls.

As a further benefit, the device hub 680 enables the electronic eyewear device backend services development team to perform customizations without adversely affecting the functioning of the application features. The device hub 680 also enables mock endpoints during development, which would be an added benefit during development to unblock client teams in continuing development of the features.

Figure 10:
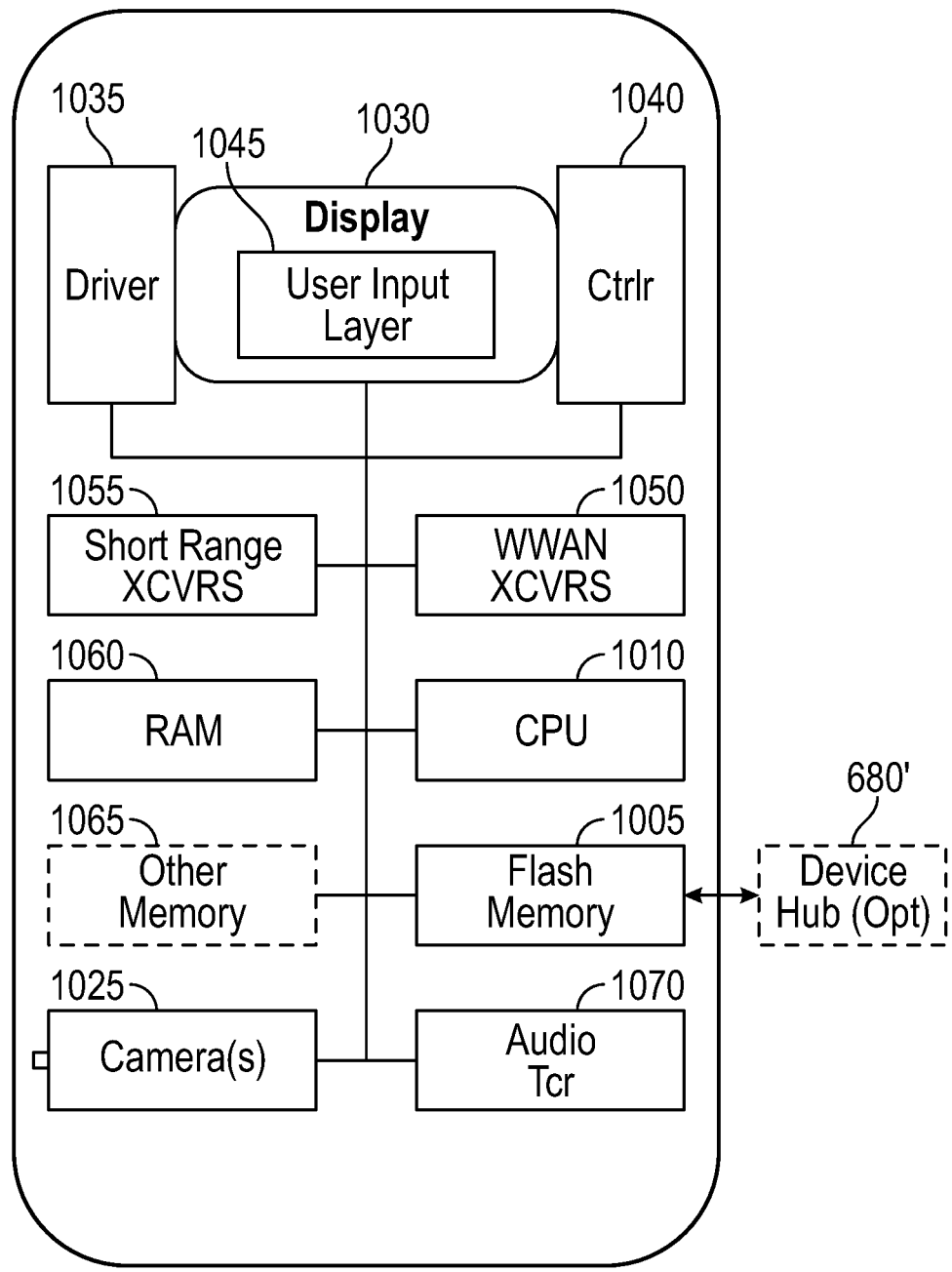
FIG. 10 illustrates a sample configuration of a mobile phone including a device hub adapted for use with an electronic eyewear device in a sample configuration.

In further sample configurations, the device hub 680 need not be a separate component that is accessed through the mobile device 690 as shown in FIG. 6 but may be integrated into the client device 810. In this configuration, the electronic eyewear device 100 would communicate via WI-FI® directly with the server using authorizations from the mobile client device 810. Upon authorization, all further communications could be direct whereby the device hub 680 need not be tethered to the mobile client device 810. For example, FIG. 10 illustrates a sample configuration of the mobile phone 690 adapted to provide a device hub 680' for use with an electronic eyewear device 100. In particular, FIG. 10 is a high-level functional block diagram of an example mobile device 690 that a user may use as the client device 810 but adapted to include a device hub 680'. Mobile device 690 may include a flash memory 1005 that stores programming to be executed by the CPU 1010 to perform all or a subset of the functions described herein. For example, the flash memory may store software for implementing the device hub 680' for execution by CPU 1010. The mobile device 690 may further include a camera 1025 that comprises one or more visible-light cameras (first and second visible-light cameras with overlapping fields of view) or at least one visible-light camera and a depth sensor with substantially overlapping fields of view. Flash memory 1005 may further include multiple images or video, which are generated via the camera 1025.

The mobile device 690 may further include an image display 1030, a mobile display driver 1035 to control the image display 1030, and a display controller 1040. In the example of FIG. 10, the image display 1030 may include a user input layer 1045 (e.g., a touchscreen) that is layered on top of or otherwise integrated into the screen used by the image display 1030. Examples of touchscreen-type mobile devices that may be used include (but are not limited to) a smart phone, a personal digital assistant (PDA), a tablet computer, a laptop computer, or other portable device.

However, the structure and operation of the touchscreen-type devices is provided by way of example; the subject technology as described herein is not intended to be limited thereto. For purposes of this discussion, FIG. 10 therefore provides a block diagram illustration of the example mobile device 690 with a user interface that includes a touchscreen input layer 1045 for receiving input (by touch, multi-touch, or gesture, and the like, by hand, stylus, or other tool) and an image display 1030 for displaying content.

As shown in FIG. 10, the mobile device 690 may include at least one digital transceiver (XCVR) 1050, shown as WWAN XCVRs, for digital wireless communications via a wide-area wireless mobile communication network. The mobile device 690 also may include additional digital or analog transceivers, such as short-range transceivers (XCVRs) 1055 for short-range network communication, such as via NFC, VLC, DECT, ZigBee, BLUETOOTH® or WI-FI®. For example, short range XCVRs 1055 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 690, the mobile device 690 also may include a global positioning system (GPS) receiver. Alternatively, or additionally, the mobile device 690 may utilize either or both the short range XCVRs 1055 and WWAN XCVRs 1050 for generating location coordinates for positioning. For example, cellular network, WI-FI®, or BLUETOOTH® based positioning systems may generate very accurate location coordinates, particularly when used in combination. Such location coordinates may be transmitted to the mobile device 690 over one or more network connections via XCVRs 1050, 1055.

The transceivers 1050, 1055 (i.e., the network communication interface) may conform to one or more of the various digital wireless communication standards utilized by modern mobile networks. Examples of WWAN transceivers 1050 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 1050, 1055 provide two-way wireless communication of information including digitized audio signals, still image and video signals, web page information for display as well as web-related inputs, and various types of mobile message communications to/from the mobile device 690.

The mobile device 690 may further include a microprocessor that functions as the central processing unit (CPU) 1010. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 1010. The CPU 1010, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 1010 or processor hardware in smartphone, laptop computer, and tablet.

The CPU 1010 serves as a programmable host controller for the mobile device 690 by configuring the mobile device 690 to perform various operations, for example, in accordance with instructions or programming executable by CPU 1010. For example, such operations may include various general operations of the mobile device 690, as well as operations related to the programming for features of the communication application as described herein. Although a processor may be configured by use of hardwired logic, typical processors in mobile devices are general processing circuits configured by execution of programming.

The mobile device 690 further includes a memory or storage system, for storing programming and data. In the example shown in FIG. 10, the memory system may include flash memory 1005, a random-access memory (RAM) 1060, and other memory components 1065, as needed. The RAM 1060 may serve as short-term storage for instructions and data being handled by the CPU 1010, e.g., as a working data processing memory. The flash memory 1005 typically provides longer-term storage.

Hence, in the example of mobile device 690, the flash memory 1005 may be used to store programming or instructions for execution by the CPU 1010. Depending on the type of device, the mobile device 690 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 690 may include an audio transceiver 1070 that may receive audio signals from the environment via a microphone (not shown) and provide audio output via a speaker (not shown). Audio signals may be coupled with video signals and other messages by a messaging application or social media application implemented on the mobile device 690.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
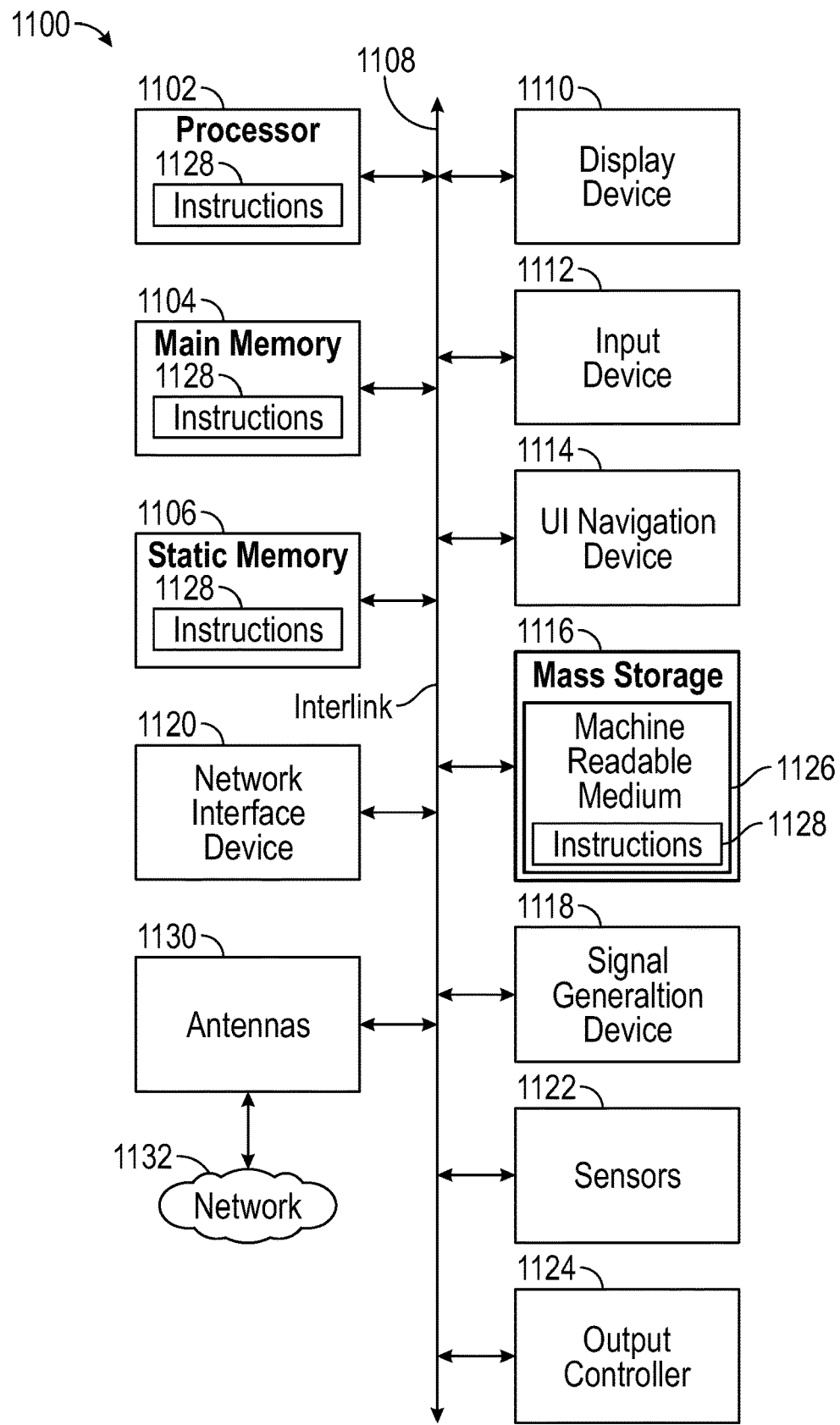
FIG. 11 illustrates a sample configuration of a computer system adapted to implement at least one of the server and the device hub in accordance with the systems and methods described herein.

By way of example, FIG. 11 illustrates a sample configuration of a computer system 1100 adapted to implement at least one of the server 720 or the device hub 680 in accordance with the systems and methods described herein. In particular, FIG. 11 illustrates a block diagram of an example of a machine 1100 upon which one or more configurations may be implemented. In alternative configurations, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample configurations, the machine 1100 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein by running the software used to implement the bots generated as described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 may include an output controller 1124, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., at least one of a centralized or distributed database, or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 720 or host computer of the service provider into the computer platforms of the client devices 810. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
    an electronic eyewear device adapted to request application services in connection with display of at least one of images or information in a viewing area of the electronic eyewear device;
    a backend server having a processor that executes instructions to provide application services in response to an application services request from the electronic eyewear device; and
    a device hub comprising an edge proxy server for processing the application services request from the electronic eyewear device, the edge proxy server providing a standardized request/response optimized schema for providing a standardized communication between the electronic eyewear device and the backend server in response to the application services request in a standardized format adapted to minimize network requests, providing the standardized communication to at least one backend service of the backend server, receiving a response to the standardized communication from the at least one backend service of the backend server, and providing application services from the at least one backend service of the backend server to the electronic eyewear device in response to the application services request,
    wherein the device hub issues asynchronous requests to at least two backend services of the backend server in response to the application services request from the electronic eyewear device and merges responses from the at least two backend services of the backend server into a response to return to the electronic eyewear device in response the application services request.

2. The system of claim 1, wherein the backend server receives, via the device hub, communications from a mobile communication device that implements an application program in connection with the electronic eyewear device and provides application services to the electronic eyewear device based on responses from the backend server.

3. The system of claim 2, wherein the device hub is incorporated into the mobile communication device.

4. The system of claim 1, wherein the device hub at least one of unifies data routing between the electronic eyewear device and the backend server, provides caching and retry capabilities for a failure of an application programming interface of the electronic eyewear device, provides shadowing for testing new versions of services provided by the backend server, manages non-compatible changes of the backend server to be compatible with the electronic eyewear device, or provides integration with updated operating systems for the electronic eyewear device.

5. The system of claim 1, wherein the edge proxy server modifies or switches the backend services provided to the electronic eyewear device by the backend server without changing code on the electronic eyewear device.

6. The system of claim 1, wherein the device hub implements multiple features that are called by the electronic eyewear device, calls corresponding backend services of the backend server in accordance with logic provided at the device hub, and provides results of the calls back to the electronic eyewear device.

7. The system of claim 1, wherein the device hub provides access logs, observability for interactions the electronic eyewear device requests, and identifies issues with backend services provided by the backend server.

8. The system of claim 1, wherein the device hub provides tracing of service calls across different service boundaries and latencies between the electronic eyewear device and respective backend services of the backend server.

9. The system of claim 1, wherein the device hub comprises a cache that caches results from at least one backend service of the backend server.

10. A method comprising:
    receiving an application services request from an electronic eyewear device for application services from a backend server in connection with display of at least one of images or information in a viewing area of the electronic eyewear device;
    providing, by an edge proxy server, a standardized request/response optimized schema for providing a standardized communication between the electronic eyewear device and the backend server in response to the application services request in a standardized format adapted to minimize network requests;
    providing, by the edge proxy server, the standardized communication to the backend server, the standardized communication including asynchronous requests to at least two backend services of the backend server in response to the application services request from the electronic eyewear device;
    receiving, by the edge proxy server, the application services from the at least two backend services of the backend server in response to the standardized communication from the electronic eyewear device;

merging responses from the at least two backend services of the backend server into a response to return to the electronic eyewear device in response the application services request; and providing, by the edge proxy server, the response to the electronic eyewear device.

11. The method of claim 10, further comprising at least one of unifying data routing between the electronic eyewear device and the backend server, providing caching and retry capabilities for a failure of an application programming interface of the electronic eyewear device, providing shadowing for testing new versions of services provided by the backend server, managing non-compatible changes of the backend server to be compatible with the electronic eyewear device, or providing integration with updated operating systems for the electronic eyewear device.

12. The method of claim 10, further comprising modifying or switching, by the edge proxy server, backend services provided by the backend server to the electronic eyewear device without changing code on the electronic eyewear device.

13. The method of claim 10, further comprising implementing multiple features that are called by the electronic eyewear device, calling corresponding backend services of the backend server in accordance with logic provided at the edge proxy server, and providing results of the calls back to the electronic eyewear device.

14. The method of claim 10, further comprising providing at least one of access logs or observability for interactions the electronic eyewear device requests, identifying issues with backend services provided by the backend server, and tracing service calls across different service boundaries and latencies between the electronic eyewear device and respective backend services of the backend server.

15. The method of claim 10, further comprising caching results from at least one backend service of the backend server.

16. A non-transitory computer-readable storage medium that stores instructions that when executed by at least one processor cause the processor to perform operations including:

receiving an application services request from an electronic eyewear device for application services from a backend server in connection with display of at least one of images or information in a viewing area of the electronic eyewear device;

providing, by an edge proxy server, a standardized request/response optimized schema for providing a standardized communication between the electronic eyewear device and the backend server in response to the application services request in a standardized format adapted to minimize network requests;

providing, by the edge proxy server, the standardized communication to the backend server, the standardized communication including asynchronous requests to at least two backend services of the backend server in response to the application services request from the electronic eyewear device;

receiving, by the edge proxy server, the application services from the at least two backend services of the backend server in response to the standardized communication from the electronic eyewear device;

merging responses from the at least two backend services of the backend server into a response to return to the electronic eyewear device in response the application services request; and providing, by the edge proxy server, the response to the electronic eyewear device.

17. The medium of claim 16, further comprising instructions that when executed by the at least one processor perform further operations including modifying or switching the at least one backend service provided by the backend server to the electronic eyewear device without changing code on the electronic eyewear device.

* * * * *